(12) United States Patent
Rest

(10) Patent No.: US 7,346,997 B2
(45) Date of Patent: Mar. 25, 2008

(54) VALIDATING DEVICE FOR VALIDATING FORMED PARTS

(75) Inventor: Olaf Rest, Richmond Hill (CA)

(73) Assignee: Martinrea International Inc.

( * ) Notice: Subject to any disclaimer, the term of this patent is extended or adjusted under 35 U.S.C. 154(b) by 29 days.

(21) Appl. No.: 11/400,264

(22) Filed: Apr. 10, 2006

(65) Prior Publication Data

US 2007/0234583 A1   Oct. 11, 2007

(51) Int. Cl.
*G01B 5/00*   (2006.01)

(52) U.S. Cl. ...................... 33/501.05; 33/551

(58) Field of Classification Search ............ 33/501, 33/501.05, 504, 550, 551, 555.1, 832, 833
See application file for complete search history.

(56) References Cited

U.S. PATENT DOCUMENTS

| | | | |
|---|---|---|---|
| 3,269,020 A * | 8/1966 | Anthony | 33/832 |
| 4,750,272 A * | 6/1988 | Caddell | 33/504 |
| 6,247,241 B1 * | 6/2001 | Hashimoto | 33/555.1 |
| 6,463,669 B1 * | 10/2002 | Rollier et al. | 33/550 |
| 2004/0154178 A1 * | 8/2004 | Herkt et al. | 33/551 |
| 2006/0201012 A1 * | 9/2006 | Dall'Aglio et al. | 33/551 |

\* cited by examiner

*Primary Examiner*—G. Bradley Bennett
(74) *Attorney, Agent, or Firm*—Dimock Stratton LLP

(57) ABSTRACT

This invention provides a validating device for validating at least one dimension of a part as being at least a minimum magnitude. It may also validate a dimension of a part as being no greater than a maximum magnitude or between a minimum magnitude and maximum magnitude. The validating device includes a frame having a cavity and employs a plunger and a sensor. One portion of the plunger engages the part and another portion activates the sensor. When the sensor activates, it indicates that the dimension of the part is at least the minimum magnitude. The cavity for receiving the part may be sized to correspond with maximum magnitudes for the same dimension and/or other dimensions for the part such that the part cannot fit in the cavity if a dimension exceeds its maximum magnitude and therefore the sensor cannot be activated and the part cannot be validated.

11 Claims, 3 Drawing Sheets

VALIDATING DEVICE FOR VALIDATING FORMED PARTS

FIELD OF THE INVENTION

This invention relates to validating devices. In particular, this invention relates to a validating device for validating formed parts.

BACKGROUND OF THE INVENTION

In a variety of applications it is essential that manufactured or formed parts meet their design specification within a certain tolerance in order to function as intended. For example, quick connect end-forms must be within certain tolerances so that a minimum pull off force is achieved. If an end-form is not within a certain tolerance (i.e. defective), the coupling could be disconnected by applying a force significantly less than the design intended force. Such a part failure may have dire consequences.

Validation of formed parts can be achieved by manual inspection of the dimensions of a part, such as by a manual pull test or shadowgraph, but this is time-consuming and therefore is typically done for only a sampling of parts. Thus it would be desirable to have a device that could validate formed parts quickly and accurately so that more, even all, parts could be validated.

BRIEF DESCRIPTION OF THE DRAWINGS

In drawings which illustrate by way of example only a preferred embodiment of the invention.

DETAILED DESCRIPTION OF THE INVENTION

The present invention is embodied in a validating device for validating at least one dimension of formed parts. Validation of a dimension of a part can be done to ensure that a part has a dimension at least as great as a minimum magnitude or no greater than a maximum magnitude or between a minimum magnitude and a maximum magnitude (inclusive). The validating device may be used to validate a dimension of any portion, including the whole, of a part. The validating device has an application as a preventative measure to ensure that no defective parts pass through to a customer.

In accordance with the preferred embodiment of the invention, there is provided a validating device for validating at least one dimension of a part, comprising: a frame having a cavity sized for receiving at least a portion of the part to be validated; a plunger having a part engaging portion for engaging the part, mounted to the block so that the part engaging portion is movable within the cavity, and a sensor activating portion; and a sensor activated by the sensor activating portion of the plunger; whereby when the part is received in the cavity and the at least one dimension of the part is at least a minimum magnitude the part moves the plunger to activate the sensor.

In accordance with the preferred embodiment of the system of the invention, there is provided a system for validating formed parts comprising: a machine for forming a first part; a validating device including a sensor that activates when the first part is validated; and a controller connected to the machine and the sensor, for controlling the machine and reading the sensor; whereby the controller prevents the machine from forming a second part until the controller reads that the sensor is activated.

Figure 1:
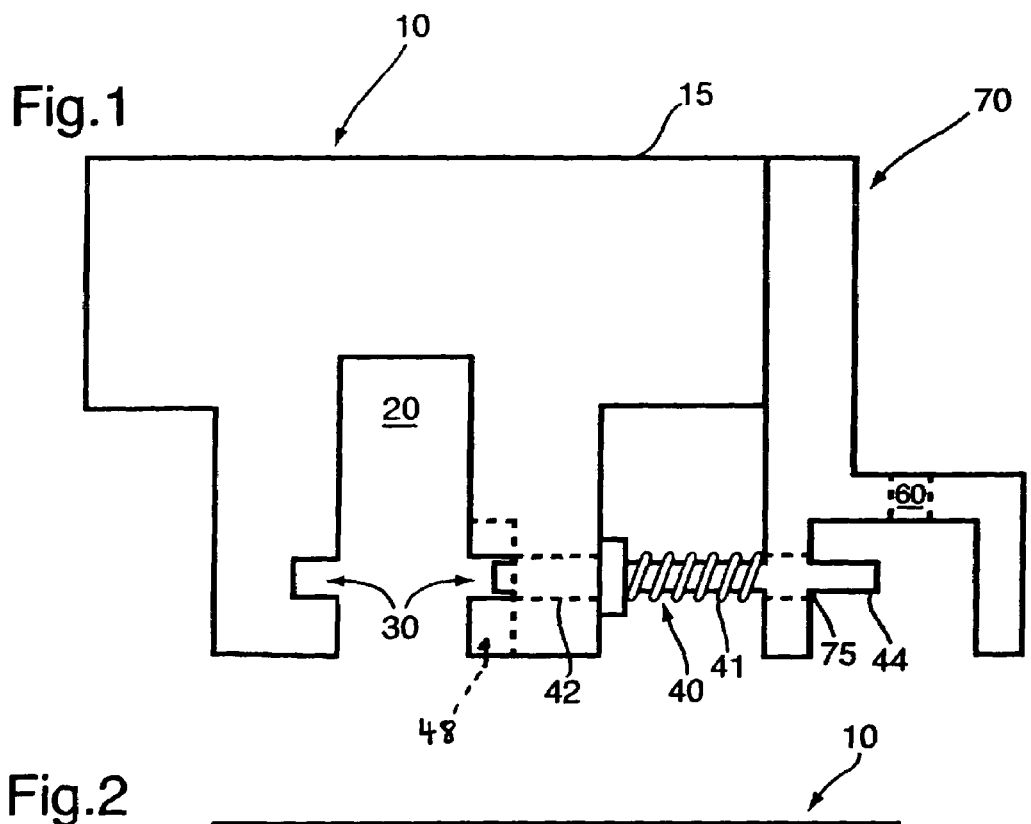
FIG. 1 shows a top view of the validating device of the preferred embodiment.
Figure 2:
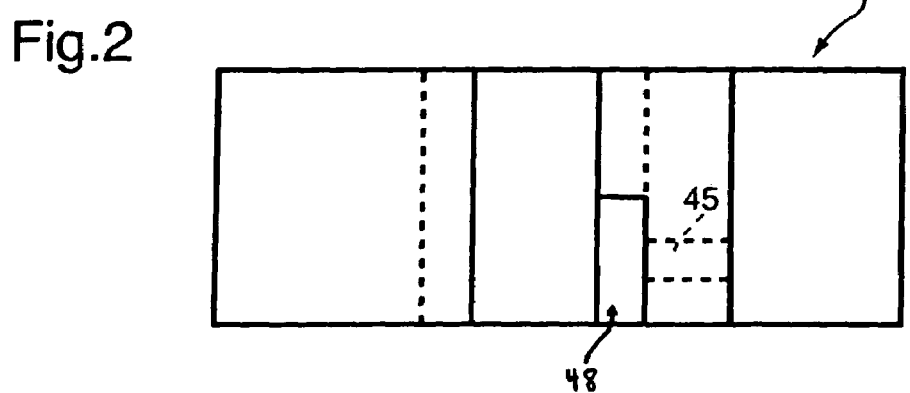
FIG. 2 shows a partial front view of the validating device of FIG. 1.
Figure 3:
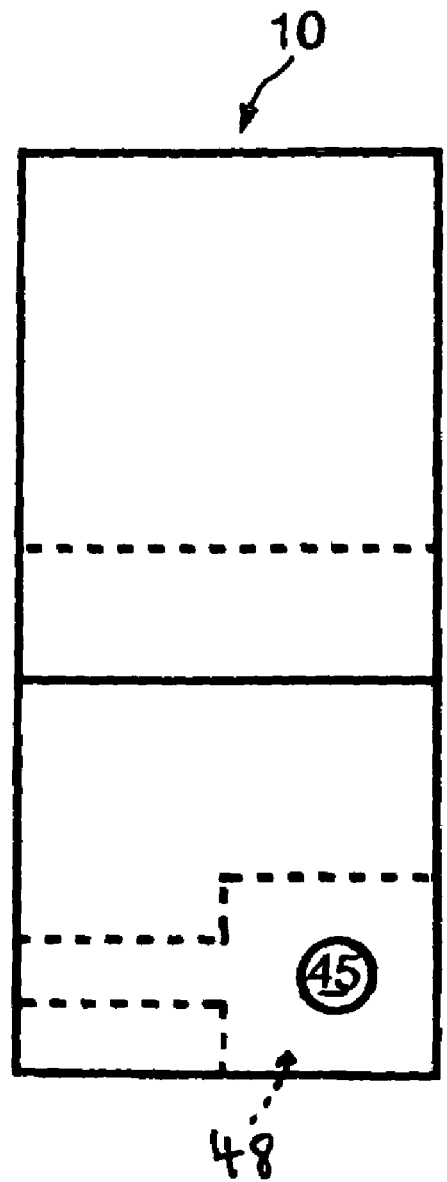
FIG. 3 shows a partial end view of the validating device of FIG. 1.
Figure 4:
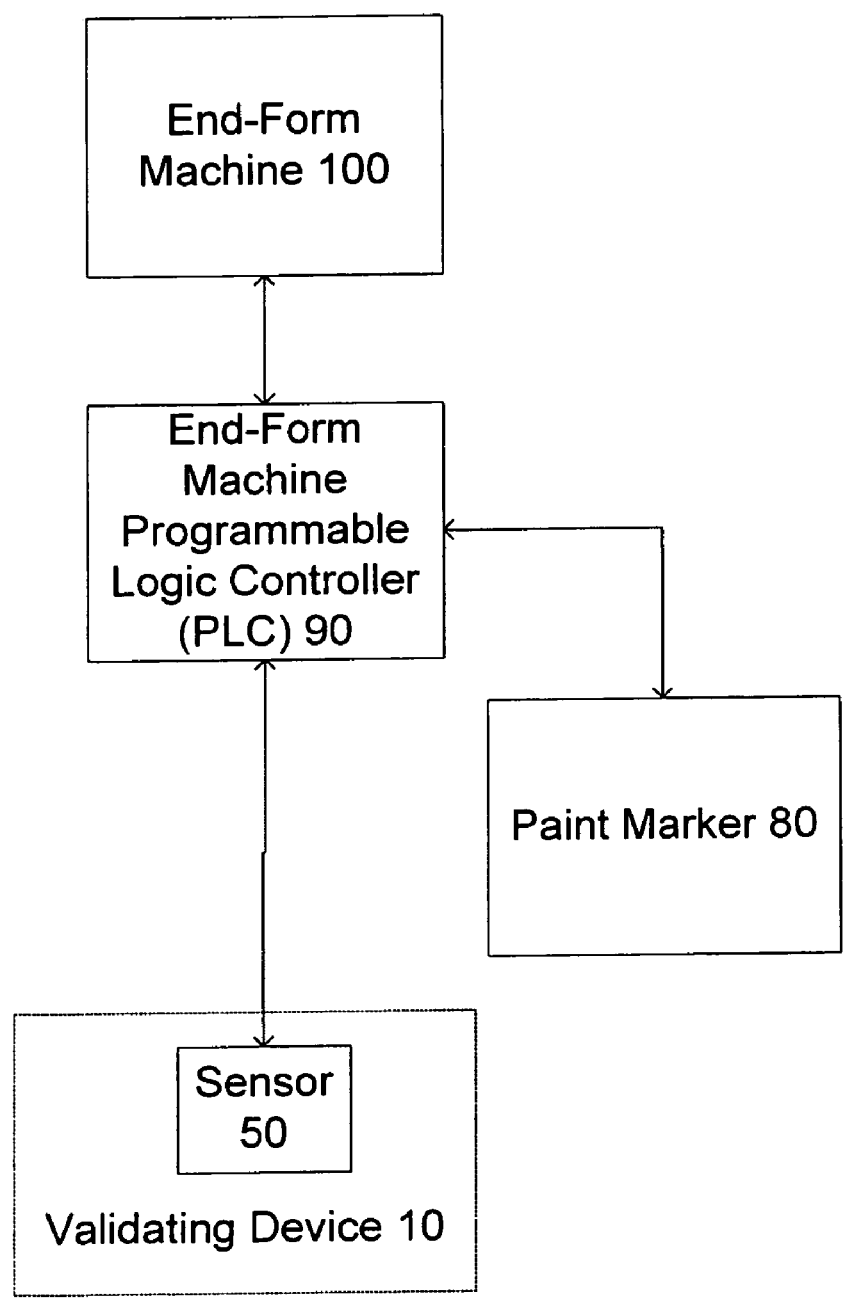
FIG. 4 shows a top view of the system of the preferred embodiment.

The preferred embodiment of the validating device, as shown in FIGS. 1 to 3, may be used to validate one or more of at least the following dimensions of an end-formed part:
bead width, no greater than a maximum magnitude;
bead diameter, between a minimum magnitude and maximum magnitude (inclusive);
seal diameter, no greater than a maximum magnitude;
front radius, no greater than a maximum magnitude;
rear radius, no greater than a maximum magnitude; and
annular surface, at least as great as a minimum magnitude.

There is a direct relation between the bead width, bead diameter, rear radius and annular surface. For example, if the bead diameter becomes smaller, the rear radius becomes larger and the annular surface becomes smaller. When the bead width, bead diameter and rear radius are controlled, the desired annular surface is achieved, which results in a good end-form.

In the preferred embodiment, the maximum bead diameter is controlled by the sizing of a cavity 30 formed in a frame, for example block 15, of the validating device 10. If the part has a bead diameter larger than the maximum bead diameter it will not fit into the cavity 30.

The cavity 30 is sized for receiving at least a portion of the part to be validated. The description below describes the invention in the context of validating a bead on a part, for which the point of validation is at cavity 30. An extension 20 of cavity 30 may be provided, providing a clearance into which projecting portions of the part S that are not being validated can extend, to ensure that the portion of the part being validated fits readily within the cavity 30. A further extension 48 may be provided adjacent to the plunger hole 45 to provide additional clearance for the part.

The plunger 40 has a part engaging portion for engaging the part, in the preferred embodiment a proximal end 42. The plunger 40 is mounted to the block 15, for example through hole 45, so that the part engaging portion (e.g. proximal end 42) is movable within the cavity 30, and a sensor activating portion, which in the preferred embodiment is a distal end 44 of the plunger 40, extends out of the block 15.

A sensor 50, which may be disposed through a hole 60 disposed in a separate sensor bracket 70 that is fastened to the block 15, is positioned to be activated by the sensor activating portion 44 of the plunger 40. Thus, when the part of at least the minimum magnitude is received in the cavity 30, the part moves the plunger 40 to activate the sensor 50.

The minimum bead diameter is thus validated by the plunger 40, for example a spring-loaded plunger having a spring 41 for biasing the plunger to a position in which the proximal end 42 is fully extended into the cavity 30, and the sensor 50. In the embodiment shown the sensor 50 is a proximity sensor, which is retained in threaded sensor hole 60 in sensor bracket 70 (not shown in FIGS. 2 and 3). Plunger 40 must engage a part having a bead diameter at least as great as the minimum bead diameter for sensor 50 to be activated. When a part having a bead diameter at least as great as the minimum bead diameter specified for the part is inserted into the cavity 30, the part pushes the proximal end 42 of plunger 40 further out of the plunger hole 45 causing the distal end 44 of plunger 40 to move into the field of view of sensor 50, which activates sensor 50. In the embodiment shown the bracket 70 includes a hole 75 through which the distal end 44 of the plunger extends, toward a field of view of the sensor 50. Plunger 40 returns to its original position once the part is removed, under the force of spring 41.

In the preferred embodiment, validating device 10 is made from hardened tool steel and wire cut to a desired accuracy. The maximum magnitudes for the front radius, the rear radius, the bead width and the maximum seal diameter of the formed part are defined by the surfaces defining cavity 30 of validating device 10. For example, validating device 10 validates the seal diameter by cavity 30 being made only to accept the maximum seal diameter. If one of the above dimensions is greater than the maximum magnitude, the part will not fit into validating device 10 and therefore sensor 50 cannot activate and the part will not be validated.

In an alternative embodiment, at least one dimension could be validated by the plunger 40 and the sensor 50 without sizing the cavity 30 or the extension 20 to correspond to maximum magnitudes of the same or other dimensions for the part. In this embodiment, the sizing of the cavity 30 and the extension 20 is larger than the maximum magnitudes of the dimensions for the part to ensure that the part fits in the cavity 30 and the extension 20 of the validating device 10.

In the system of one preferred embodiment, the sensor 50 of validating device 10 is connected to an end-form machine programmable logic controller (PLC) 90, which controls the operation of an end-form machine 100. The PLC 90 is programmed so that sensor 50 must be activated for the end-form machine 100 to reset. The end-form machine 100 must reset after forming a part in order to be able to form the next part. Thus, in operation, when sensor 50 activates, the PLC 90 reads the activated condition of the sensor 50 and proceeds to reset the end-form machine 100 so that it may form the next part. Accordingly, an operator must validate a part using validating device 10 before the end-form machine 100 can produce the next part. If a defective part is generated, it will not be validated by validating device 10. In this case, the end-form machine 100 will remain locked up and will require someone, for example a supervisor, to reset the machine 100.

Optionally, the PLC 90 may be connected to a marker, such as paint marker 80, for marking validated parts. In this embodiment, when the sensor 50 activates, the PLC 90 reads the activated condition of sensor 50 and controls marker 80 to mark the validated part.

Preferably, validating device 10 is calibrated periodically, for example every three months. Validating device 10 should also be verified daily through the use of master setup tools (not shown). The master setup tools are precisely formed master parts used to ensure the proper calibration of plunger 40. In the preferred embodiment, the master setup tools comprise two setup pins. The first setup pin has a bead diameter at the minimum magnitude, which should activate the sensor 50 when the operator attempts to validate the part if the plunger 40 is properly calibrated. The second setup pin has a bead diameter slightly less than the minimum magnitude, which should not activate the sensor 50 when the operator attempts to validate the part if the plunger 40 is properly calibrated. Thus, the setup pins are used in order to ensure accurate validation of bead diameter. In the preferred embodiment, the master setup tool also ensures the sealing surface is verified for maximum magnitude. There may be different master setup tools for all sizes of parts. The master setup tool should also be verified periodically, for example every six months. When properly calibrated, the validating device 10 may achieve accurate validation more quickly and reliably than can be achieved by manual inspection.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A validating device for validating at least one dimension of a part, comprising:
    a frame having a cavity sized for receiving at least a portion of the part to be validated;
    a plunger having
        a part engaging portion for engaging the part, mounted to the block so that the part engaging portion is movable within the cavity, and
        a sensor activating portion; and
    a sensor activated by the sensor activating portion of the plunger;
    whereby when the part is received in the cavity and the at least one dimension of the part is at least a minimum magnitude the part moves the plunger to activate the sensor.

2. The validating device of claim 1 wherein the cavity is sized to correspond with a maximum magnitude for at least one dimension of the part.

3. The validating device of claim 1 wherein the part engaging portion of the plunger is a proximal end.

4. The validating device of claim 1 wherein the sensor activating portion of the plunger is a distal end.

5. The validating device of claim 1 wherein a plunger hole retains the plunger.

6. The validating device of claim 1 wherein a sensor hole retains the sensor.

7. The validating device of claim 1 wherein the sensor is a proximity sensor having a field of view and activated when the sensor activating portion of the plunger moves into the field of view of the proximity sensor.

8. The validating device of claim 7 wherein the sensor activating portion of the plunger is a distal end.

9. The validating device of claim 1 wherein the plunger further comprises a spring to bias it to a fully extended position within the cavity.

10. A system for validating formed parts comprising:
    a machine for forming a first part;
    a validating device including a sensor that activates when the first part is validated; and
    a controller connected to the machine and the sensor, for controlling the machine and reading the sensor;
    whereby the controller prevents the machine from forming a second part until the controller reads that the sensor is activated.

11. The system of claim 10 further comprising a marker controlled by the controller that marks the first part after the controller reads that the sensor is activated.

* * * * *